Jan. 5, 1937. J. W. HAYS 2,066,348
WATER TREATER AND HEATER
Filed April 21, 1933 2 Sheets-Sheet 2
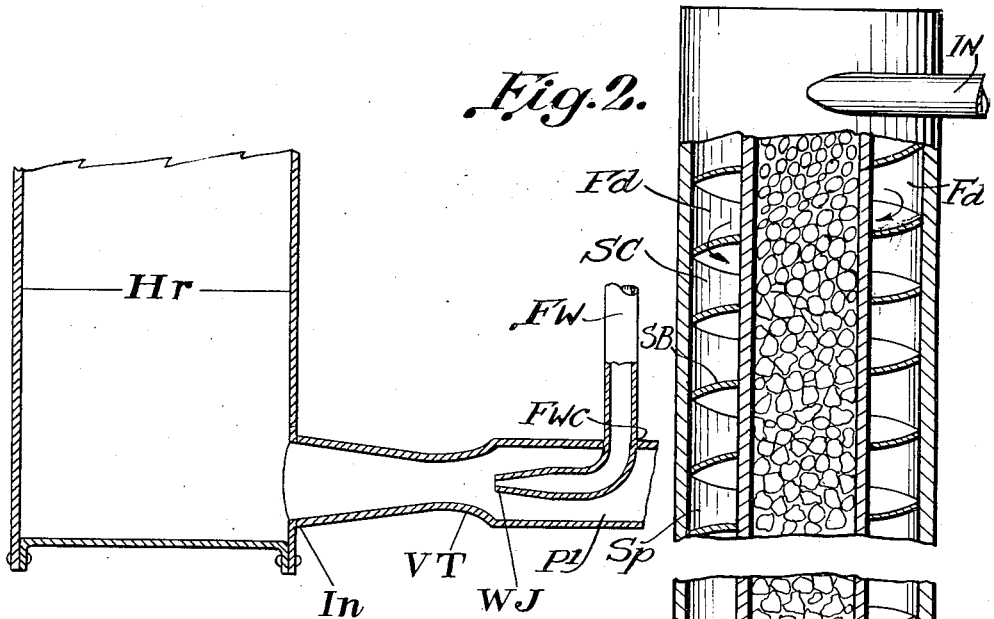

Patented Jan. 5, 1937

2,066,348

UNITED STATES PATENT OFFICE 2,066,348

WATER TREATER AND HEATER

Joseph W. Hays, Tulsa, Okla.

Application April 21, 1933, Serial No. 667,254

3 Claims. (Cl. 210—15)

One object of my invention is to remove all foreign matter, whether in suspension or solution, thus rendering the water fit for use in steam boilers or in processes requiring pure water, and the like. This is accomplished by heating the water to a temperature sufficient to throw down all such material and to accumulate it by sedimentation in a place from whence it may be drawn out of the heating system. There is nothing novel in the method of purifying water by the application of heat. What is known as "temporary hardness" may be cured by heating the water to 212° F., whereupon most of the bi-carbonates are broken down to insoluble carbonates and are precipitated. What is known as "permanent hardness" can be cured by heating the water for a sufficient period at temperatures above 302° F.

Many surface and sub-surface waters in the Southwestern States and along the Gulf coastal regions carry salt, or sodium chloride, in solution. For example the Arkansas River at Tulsa has been known to carry as much as 80 grains of salt per gallon out of a total of 130 grains of solid matter. Many well waters in the Midcontinent field carry 12 or more grains per gallon of sodium chloride. The subsurface waters in the coastal region, especially those in the neighborhood of salt domes, carry enough salt to preclude their use as boiler waters. The solubility of sodium chloride increases with increase of temperature and this renders it impossible to dispose of the salt by precipitation, altho some salt will be thrown down when the concentration has been raised to the saturation point. When waters of the above description are taken into a boiler it is necessary to blow down very frequently in order to avoid the high concentrations. This results in a huge waste of heat energy as the quantity of water "blown down" sometimes is as high as 25 per cent of the total feed-water taken. Chemical treatment to precipitate the other scale forming materials has no effect upon the salt. My invention makes it possible to use feed waters carrying salt in solution and without permitting any of the salt or other mineral solid matter to enter the boiler. This is accomplished by evaporating the water in the treater equipment and delivering nothing but steam to the boiler, the boiler in such case being fed direct with pure water condensed from exhaust steam. The treater, in such case, is called upon to handle only the make-up water, and the concentrations in the treater may be built up to a high point before blowing down and without danger of depositing scale upon the non-heated surfaces of the treater settling tank. To put salt-carrying make-up water into a boiler which is being fed with condensate is wasteful in the extreme because it involves blowing large quantities of water out of the boiler at low concentrations whereas by the use of my treater and process it is necessary to blow only small quantities of water out of my treater at high concentrations. When the make-up water contains salt my treater will put all of the "make-up" into the boiler in the form of steam.

Of the numerous methods of purifying water, that of the use of chemicals is in most common practice and this method is far from satisfactory, partly on account of its cost, which is usually high, and partly because the collateral results of the cure are sometimes worse than the original trouble. Careful and frequent analyses of the raw water are usually necessary and frequent changes in the quantities and, sometimes of the kinds, of the chemicals used are called for. What is known as "caustic embrittlement" is said to result from an excess of alkalinity in the water and there have been many cases of complete boiler failures from this cause.

The thermal process of treating water is preferable to all others wherever it can be fully applied. One trouble with this process has been that of settling out some of the lighter and more flocculent precipitable substances, notably some of the compounds of magnesium. One of the objects of my invention is the obviation of this trouble without resorting to chemical means.

Another object of my invention is that of preheating water above the temperature ordinarily attained in water heaters, even above the temperature of the water in a steam boiler to which the heater may be attached as a service auxiliary. Such high preheating of the feed-water necessarily results in a great increase in the steam output of the boiler and, as my heaters are highly efficient, this increase in steam output is attended by a decrease in the fuel cost of generating the steam.

I attain the objects of my invention by the means illustrated in the accompanying drawings, in which—

Figure 2 is a cross sectional view, but not in full detail, of the heating device proper. This figure has been borrowed from my copending application, dated March 1, 1933, filed March 18, 1933, Serial Number 661,625, for patent on Apparatus for accelerating the transfer or heat from a heating element to a fluid.

Figure 3 is a detail of the connection, FW, with P¹, Figure 1.

Figure 1:
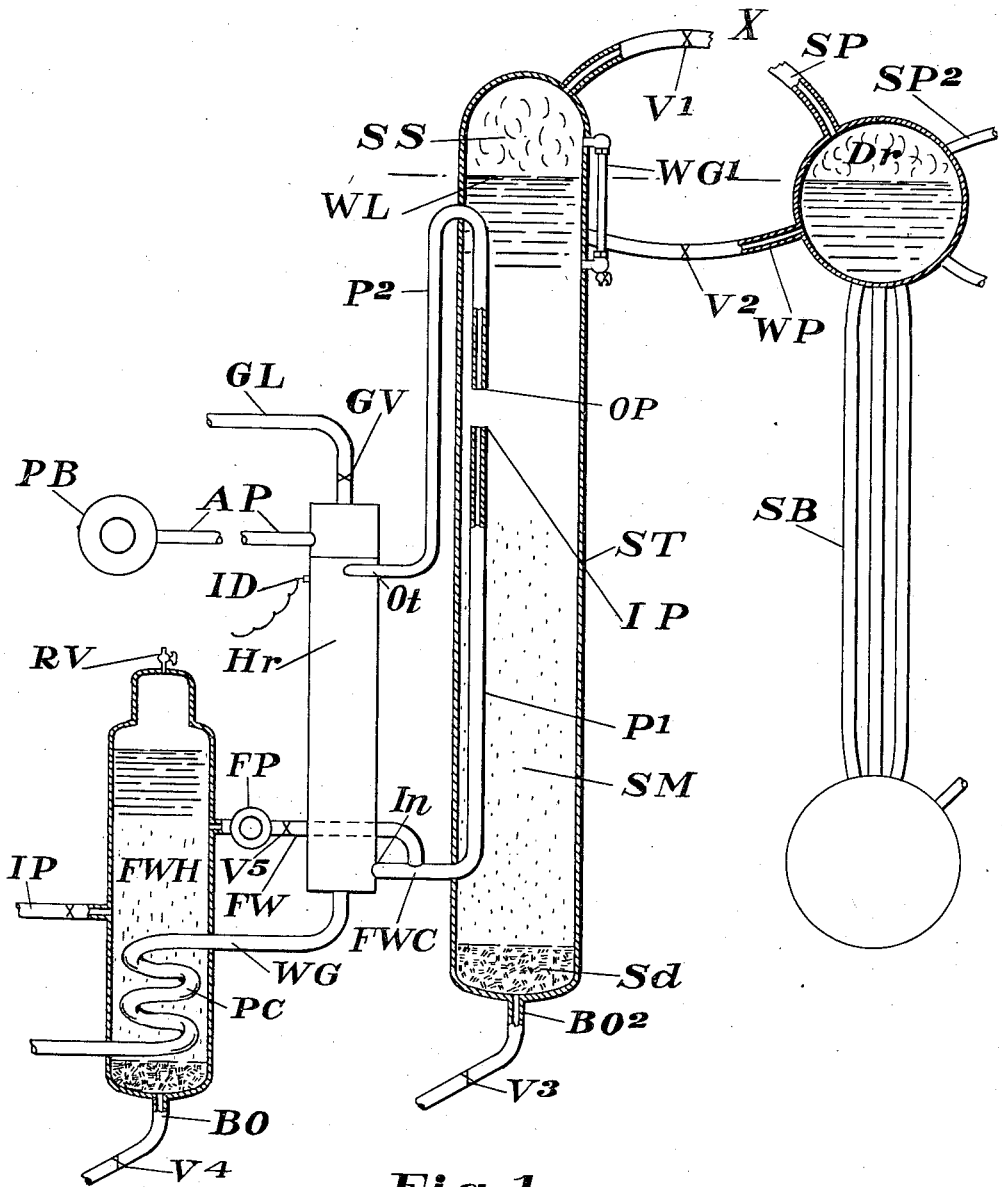
Figure 1 is a somewhat diagrammatic view of my treater, which also acts in this instance as a feed-water heater for a steam boiler.

In Figure 1, Hr is the heating device and ST is a settling tank and hot water reservoir. The scale-forming materials, SM, which are released from solution by the heat, settle slowly to the bottom of ST where they accumulate as sediment, Sd. SB is that portion of a boiler of the water tube type to which the tank, ST, would, preferably, be connected. SP is a steam pipe leading from the steam space, SS, in ST and connecting with Dr. SP² is one of the steam pipes connected with the boiler drum, Dr. V¹ is a valve on SP by means of which steam in SS may be admitted to, or shut off from, the boiler, SB. WP is a water pipe connecting ST with Dr, the connections being below the water line in each case. V² is a valve in WP which may be open to permit the flow of water from ST to Dr, or vice versa. When V¹ and V² are both open, the water levels, WL, in ST and Dr are the same.

FWH is a feed water heater, preferably of the open type, which is supplied with water, presumably in its raw state, through the pipe IP, and which may or may not be heated with exhaust steam, or by some other independent means. In the drawings I show the pipe, WG, carrying the waste hot gases from the heater, Hr, as discharging into a pipe coil, PC, in FWH, by means of which some of the heat in the waste gases is recovered by the water in FWH. Should the water in FWH be raised to a temperature sufficient to throw down carbonates or other materials, these would, naturally, be precipitated to the bottom of FWH and deposited as mud or held in a state of concentrated suspension. The precipitated materials may be drawn off through the blow-off pipe, BO, by opening the valve V⁴. WG¹ is a water gage on ST.

FP is a feed pump, taking water from FWH and discharging through FW, (the valve, V⁵, being open) into P¹, the manner of the connection, FWC, between FW and P¹, being shown in Figure 3. Water from FWH accordingly flows direct to the heater, Hr, drawing with it water from the settling tank, ST, through the pipe, P¹, thereby establishing circulation in ST, via P¹, Hr and P².

PB is a pressure blower, of any approved type, which forces air through the pipe, AP, to the burner of the heater, Hr. GL is a gas line, or vapor line, carrying the combustible fluid under pressure. GV is a control valve on GL.

In Figure 2 some of the details of the heater, Hr, Figure 1, are shown. This heater comprises a combustion tube, CT, which is packed throughout its length with refractory materials, Re, the voids or interstices in the packing being such that the combustion gases may circulate from one end of the tube to the other. SB is a spiral baffle welded to CT and J is a jacketing tube in close contact with SB. The space, Sp, between the two tubes is closed at the ends in such a way that there is a continuous conduit, SC, from the inlet, In, to the outlet, Ot, for the circulation of the fluid, Fd, which is to be heated.

MD is a mixing device for commingling the air which is received by the pipe, A, from the pressure-blower, PB, through the pipe, AP, both shown in Figure 1. The fuel, whether gas, vapor, or what-not, is delivered to MD by P, which, in its turn, is supplied through the pipe, GL, shown in Figure 1. ID is an igniting device, which may be a spark plug, as shown, or any other lighting means answering the purpose. Upon ignition the mixture of air and combustible burns in the combustion zone, CZ, which is indicated by the dotted lines in the drawings. The refractories act as catalysts, combustion takes place without flame and the temperature in CZ is very high, the heat in CZ being produced very largely in the radiant form. The gases leaving the combustion zone, CZ, flow onward among the refractories giving up their heat as they go and make their exit through WG, as shown in Figure 1. The flow of the fluid which is being heated is counter-current, as indicated by the drawings, Figure 2, to the flow of the gases through CT.

When a heater of this kind is used to heat water carrying scale-forming materials the velocity of the water passing through SC is high enough to prevent the deposit of scale upon the heating tube, CT, or upon any portion of the walls of the conduit. The water flows several times as far in its spiral course about CT, on traveling from In to Ot, as it would have to flow if SB were not present. The flow velocity is increased in proportion to the increase in the length of travel.

In Figure 3, FW is the feed-water pipe as in Figure 1. In is the inlet pipe to the heater, as in Figure 2. Hr is the designation used for the heater, as in Figure 1. VT is a Venturi tube which may be connected with P¹ and In in any approved manner.

The utility of my invention will be made clear if I next explain how it operates in connection with a steam boiler, and to this end it will be assumed that the raw feed water contains scale-forming materials, or that the boiler cannot produce sufficient steam to meet the requirements, or that both of these conditions exist.

The raw water first passes into the feed-water heater, which may be of any design suited to the conditions. Here the water is heated by exhaust steam, or in any other manner. I have shown how heat may be recovered in the feed-water heater from the hot gases from the heater, Hr, if considered desirable to do so. The feed-water heater, FWH, should preferably be of the open type in order that oxygen, carbon dioxide and other gases which may be carried by or released in the water may be discharged to the air, as these gases might act injuriously upon the boiler. RV is a valve for the release of the said gases.

If sufficient heat is available some of the scale-forming materials, notably some of the bicarbonates, will be thrown down, as already stated, and deposited as carbonates in the bottom of FWH, the carbon dioxide which is released escaping to the air.

The feed-pump, FP, now picks up the partially purified water from FWH and discharges it at OP into ST through the heater, Hr, and the pipe, P². The arrangement of the pipes, P¹ and P², is such that water will constantly flow through P¹ to and through the heater, Hr, thence back into ST through P², the combination of the heater, Hr, with the tubes, P¹ and P², constituting a thermo-siphon system.

The feed-pump, through the line FW, discharges into the mouth of the Venturi tube, VT, which is connected, as already stated, between P¹ and In. The combined effects of the water jet, WJ, Figure 3, and the Venturi tube, VT, when added to that of the thermo-siphon, cause a steady circulation of water between the heater, Hr, and the settling tank, ST, thereby building up and maintaining a high temperature in ST above the level, IP. It will be noted that there is no circulation of the water in ST below the level, IP, and that the temperature of the water below that level may be much lower than above it. In order that the sedimentary matter, SM, may be precipitated readily to the bottom of the tank from whence it may be drawn off from time to time through BO², as desired, it is necessary that the water below IP be kept in as quiescent a state as possible.

It will be noted that as high a temperature as desired may be built up in ST above the line IP, provided the valves V¹ and V² are closed and that if these two valves are kept open as steam and water connections to the boiler, the temperature and pressure in the steam space, SS, would be the same as in the steam space of the boiler. The treater-heater thus becomes an integral part of the boiler and its capacity to heat water and produce steam may thus be added to the capacity of the boiler, as normally fired. Any such increase in capacity may be had without putting additional strains upon the boiler, provided that the working pressure of the boiler is not increased. To attain such increased capacity by firing the boiler furnace more heavily would strain the tube system of the boiler and be destructive of the furnace brick work.

The heater, Hr, may be placed in any position, whether vertical, horizontal or otherwise. In Figure 1 it is shown in a vertical position, the course of the gases being downward. In Figure 2 the heater is indicated as in the opposite position, the burner being at the bottom and the course of the gases being upwards.

In my drawings I have shown but one heater, Hr, connected with the settling tank, ST. This heater may have a capacity of delivering 500,000 British thermal units per hour, or thereabouts, to the water circulated through the heating system. The quantity of heat delivered will depend upon the size of the tube and the pressure applied to the air and the gas, as well as upon other things. Should one heater tube be insufficient, in any case, as many more may be added as desired.

I do not hold myself as limited in any way to the number of heater tubes or elements, Hr, employed.

When two or more heaters, Hr, are used, they may be connected separately with ST, each functioning as a complete heating unit in itself, or they may be connected with each other in series, the outlet pipe, Ot, of the first heater being connected with the inlet pipe, In, of the second heater, and so on, thereby making all of the heaters function together as an integral heating unit.

While I have shown a special form of heating apparatus and shall claim it in combination with the other elements of my invention, I do not hold myself as limited in any way to the heater shown, or to any other particular type of heater, as it is clear that any form of heating element, adaptable for the purpose, could be used without departing from the spirit of my invention.

It will be seen that the apparatus will operate solely as a water treater and settling tank, or as a water treater and preheater, delivering highly heated feed water to the boiler through the pipe, SP, the valve V¹, being closed, or as an integral part of the boiler, SB, the valves V¹ and V², both being open, or as an evaporator to produce pure water for a boiler, a condenser being provided at some point, as at X, in the line SP, Figure 1, or as a water treater, heater and boiler, complete in itself, the steam produced being delivered from SS through SP to any point desired.

So far as I am acquainted with the art no form of apparatus has previously been disclosed which is capable of functioning completely in itself as a water treater, water heater, evaporator, or steam boiler, either separately or combined in any two or more of these several capacities, and I therefore claim:

1. A water purifier comprising a fired heater element and an unfired settling and storage tank, said heater comprising a vertically disposed water chamber having a cylindrical furnace extending entirely therethrough, a pipe connection leading from near the bottom of said water chamber and communicating with said unfired tank, a pipe leading from near the top of said water chamber and connecting with said unfired tank, a connection for raw water in said first mentioned pipe and comprising a nozzle set into said pipe and directed toward said heater, means for introducing and burning fuel in the upper part of said chamber and for forcing the products of combustion downward through said furnace.

2. A water purifier comprising a fired heater element and an unfired settling and storage tank, said heater comprising a vertically disposed water chamber having a furnace extending entirely therethrough, means for producing combustion in the upper part of said furnace and for forcing the products of combustion downwards through said furnace, a pipe connection between the lower part of said heater chamber and said settling and storage tank near the middle part thereof, a pipe connection between the upper part of said heater water chamber and said settling and storage tank near the middle part thereof and a connection for raw water in said first mentioned pipe comprising a nozzle located therein and directed toward said heater chamber.

3. In a device for treating water to remove impurities causing hardness of the water, the combination of a settling tank, a water heater comprising a combustion chamber and a water jacket disposed about the combustion chamber, conduits connecting opposite ends of the water jacket with the mid-portion of the settling tank to form a circulation system allowing water to recirculate through the jacket and said settling tank, means for supplying fuel to the combustion chamber to burn therein, means for forcing impure water into said circulation system adjacent said jacket to cause the impure water to mix with the recirculated water and pass through said jacket to said settling tank in a direction counter to the flow of the combustion products and means for utilizing the combustion products to heat the impure water prior to mixing with the recirculated water.

JOSEPH W. HAYS.